United States Patent Office 3,259,415
Patented July 5, 1966

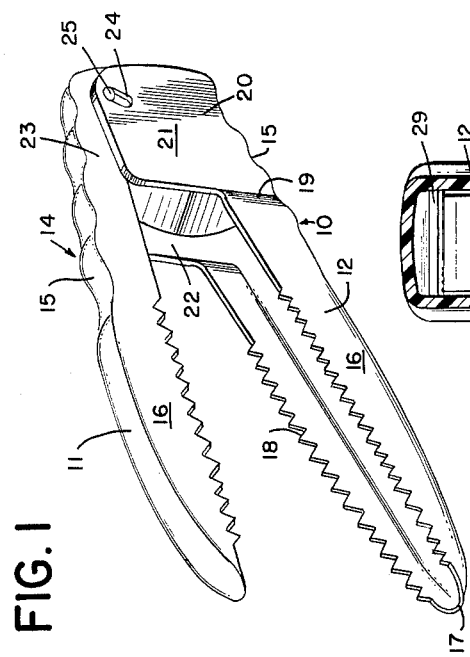
July 5, 1966   W. J. HOWARD   3,259,415
FISH TONGS
Filed April 1, 1964
INVENTOR.
WILLIAM J. HOWARD
ATTORNEY

3,259,415
FISH TONGS
William J. Howard, P.O. Box 573, Wilson, N.C.
Filed Apr. 1, 1964, Ser. No. 356,441
7 Claims. (Cl. 294—16)

This invention pertains to fishing equipment for clasping the individual fish, as in removing a fish from a hook, and more specifically this invention comprises a fish tong.

In the handling of fish, especially live ones, there is an ever present danger of the fisherman having his hand stuck or cut by a fin, and infection often follows. Prior protective devices in this area have suffered by reason of poor design, including such short-comings as rusting, sinking when dropped into water, high cost of production, etc.

The primary object of the present invention, therefore, is to provide an improved one-piece, homogeneous fish tong of a design that can readily be produced by injection molding.

A further object of this invention is to provide an all-plastic fish tong of the type aforementioned, with resultant immunity from rust, and economy of manufacture.

Yet another object of this invention is to provide a fish tong of the type aforementioned wherein the arms of the tong are channeled, and the edges of the side walls of the arms bear substantially parallel rows of teeth.

Other objects and advantages of the present invention will become apparent in the following specification when considered in the light of the accompanying drawings, in which:

FIG. 1 is a perspective of my improved tong in its normal or open position;

FIG. 2 is a side elevation of my tong, in closed position, a portion of the handle portion of one arm thereof being broken away;

FIG. 3 is a side view of my tong substantially as removed from the die, the ends of the arms being cut off and the handle portion being in lengthwise section;

FIG. 4 is a cross-sectional detail of the pin and slot construction for limiting relative outward movement of the arms of the tong, and FIG. 5 is a cross-section taken along line 5 of FIG. 2.

Referring now to the drawings in detail, wherein like reference numerals designate like parts throughout the several figures, 10 designates generally a fish tong constructed in accordance with the present invention. While it may be possible to construct the present invention of ordinary sheet metal, such material is unsatisfactory because of its tendency to rust, sinking when dropped into water, necessity of painting same, and the virtual impossibility of attaining a homogeneous, one-piece construction. Therefore, I form my tong of plastic material.

Tong 10 includes a pair of channelled arms 11, 12, the arms being integrally joined by flexible hinge portion 13. In practice, each arm is on the order of eight inches in length, and of substantially U-shape in cross-section for lightness, economy of material, and other purposes, as will appear hereinafter. The outer surface of each arm is provided adjacent hinge portion 13 with a hand grip portion 14 formed with transverse shallow grooves 15 or equivalent hand receiving formation, whereby the fingers may seize equally well either arm of the tong. From a point adjacent grip portion 14, the side walls 16 of each arm converge slightly, and at the tip of each arm an integral arcuate portion 17 connects the two side walls. Beginning adjacent hand grip portion 14, a series of teeth 18 are formed along the edges of each converging side wall 16, and the rows of teeth of the two arms are so located as to register with one another. By reason of the spaced rows of teeth 18 a tight grip on the hand portion 14 is unnecessary to dig the teeth 18 into and secure a firm grip on a fish.

Beginning at the hinge 13 and extending to a point 19, a portion 20 of both side walls of arm 12 are laterally spaced apart sufficiently to receive the corresponding end portion of arm 11 therebetween (FIG. 1). Portion 20 includes parallel fin portions 21, 22 designed to overlap the adjacent edges 23 of arm 11, even in the open position of the tong, to guide the one arm within the other and thus assure that the teeth of the two arms will not cant materially out of register. Both fin portions of arm 12, adjacent hinge portion 13, are formed with slots 24 extending at an acute angle to the axis of the arm 12; and arm 11 is provided at a location generally corresponding to slot 24, with aligned, outwardly extending projections or abutments shown in the form of short pins 25. The outer end of each abutment is beveled at 26 in a direction slanting toward arm 12, whereby upon pressing the arms together through hand grip portion 14, the abutment will, through cam action, flex the fins 21 and/or side walls of both arms sufficiently to permit the abutments 25 to snap into slots 24. Once in the slots, the abutments cooperate with the outer end of the slots to limit relative outward movement of the arms. Preferably the slots 24 should be positioned and of a length to permit normal opening of the arms about three and one-half inches, measured at the tip of the arms. It has been found that the position indicated is sufficient for gripping the body of most fish, and larger fish may be gripped by inserting one of the arms of the tong into the mouth of the fish.

Known plastics present a wide range of materials suitable for use in the present invention. I prefer, however, to make the tong of "Tenite" Polyallomer (a crystaline polymer made with olefins, such as ethylene and propylene as starting monomers) or polypropylene (both available from Eastman Chemical Products, Inc., Kingsport, Tennessee), because both materials mentioned are light enough to float if dropped over-board, possess over a wide temperature range marked qualities of recovery or "snap-back" after distortion, and these materials meet the other prerequisites of cost, durability, etc. Some plastics possess initial resilience such that hinge 13 may be designed per se to bias arms 11, 12 to open position. In the opening and closing of my tong, however, the hinge portion 13 is subjected to very little flexure, and I have found that where the degree of flexure is quite small the requisite resilience of plastics is not uniform and tends to weaken with use. It is important that the tongs normally be biased firmly to open position. Therefore, I prefer not to rely upon the resiliency of the hinge alone to bias the arms 11, 12 apart; and I provide auxiliary means to bias the arms apart, comprising a spring device in the form of a resilient leaf or strip acting at a more favorable point along the arms.

For the purpose last mentioned, as part of the injection molding operation, I form integral with the bottom 27 of one of the channelled arms 11, a resilient leaf or strip of the same material as the tong. This spring device may be on the order of $\frac{1}{16}$ inch thick, of width slightly less than the channel of the arm, and of a length on the order of three times the depth of the channel of arm 11. In the opposite arm 12, at the bottom of its channel and at a point corresponding to the point at which spring device 28 joins arm 11, I form a cross-piece 29 integral with arm 12, said cross-piece being shown as a rib projecting into the channel at an angle of about 45 degrees to the axis of arm 12. The free end of strip 28 may be inserted behind cross-rib 29 by the index finger, or the use of the eraser end of a pencil at the time the tong is first being closed to snap the abutments 25 into the slots 24. When the arms are pressed to closed position, strip 28 will be distorted to near semi-circular shape, as shown in FIG. 2; but upon release of the tong, strip 28 will resume a substantially bow-shape, with the arms biased apart.

In making a tong according to the present invention, a die is provided having open spaces or cavities therein corresponding generally to the tong as shown in FIG. 2. The polypropylene or other plastic while in fluent state is thereupon forced into the die under pressure, causing the material to flow to all open spaces within the die. Should the tong be made of a material which renders resilient strip 28 unnecessary, the strip may be deleted by merely blocking off the corresponding area of the die. The plastic material of which the tong is to be made may be provisionally colored as desired, rendering painting unnecessary.

Having thus described the preferred embodiment of the invention, it should be understood that structural modifications and adaptations, such as variations in size and dimensions of parts, may be resorted to without departing from the scope of the appended claims.

What is claimed is:

1. A one-piece, homogeneous, floatable, plastic fish tong comprising a pair of channelled arms of generally U-shape in cross-section, said arms being integrally connected at one end by a flexible, resilient hinge portion of the same material as the arms, said hinge portion tending to bias said arms to spaced, open position, the outer surface of each arm adjacent said hinge portion being formed with a hand grip portion and the edges of said arm outwardly from said hand grip portion being formed with a series of teeth, one of said arms adjacent said portion having formed therealong and as a continuation of each side edge thereof an integral fin portion extending part way the length of said grip portion, said fin portions being parallel and spaced to receive the side walls of the grip end of the other arm nicely therebetween to prevent sidewise canting of said arms during manipulation of the arms, each fin portion being formed with a like inclined slot, and the opposite arm having a short projecting abutment device formed on the outer surface of each side wall, said devices being aligned and extending into said slots for limiting outward movement of said arms, each abutment device being formed at its end with a cam surface for flexing said fins and/or side walls sufficiently for said devices to snap into said slots upon the initial closing of said arms, the bottom of the channel of one of said arms at a point within said grip portion being formed with a resilient strip projecting outwardly beyond said arm, and the other of said arms having a catch device formed in the bottom of the channel thereof at a point corresponding to the juncture of said resilient strip to its arm, resilient strip in the open, normal state of said structure being bowed, with its free end disposed between said catch device and said hinge portion, for biasing said arms to open position.

2. A one-piece, homogeneous, floatable plastic fish gripper of the kind described comprising a pair of channelled arms of generally U-shape in cross-section, said arms being integrally connected at one end by a flexible, resilient hinge portion of the same material as said arms, said hinge portion tending to bias said arms to spaced open position, the outer surface of each of said arms adjacent said hinge portion being formed with a hand grip portion and each of the edges of said arms outwardly from said hand grip portion being formed with successive notches to provide a series of teeth along each edge, one of said arms adjacent said hinge portion having formed therealong on each side and as a continuation of each side edge thereof an integral fin portion extending part way the length of said grip portion, said fin portions being parallel and spaced to receive the side walls of the grip end of the other arm closely therebetween to prevent relative sidewise canting of said arms during manipulation of the arms, and interengaging means on said interfitting fins and side walls for limiting opening movement of said arms.

3. The structure as defined in claim 2, wherein each fin portion is formed with a transversely extending slot, and the opposite arm has integral with the outer surface of each side wall a short projecting abutment device, said devices being aligned and extending into said slots for limiting outward movement of said arms upon engagement of said devices with the outermost ends of said slots.

4. The structure as defined in claim 3, wherein said abutment devices are each provided with a cam surface for flexing the side walls of said arms apart sufficiently for said devices to snap into said slots upon initial closing of the arms.

5. The structure as defined in claim 2, wherein the bottom of the channel of one of said arms at a point within said grip portion is formed with an integral resilient strip projecting outwardly beyond said arm, and the other of said arms has a catch device formed in the bottom of the channel thereof at a point corresponding to the juncture of said resilient strip to its arm, said resilient strip in the open, normal state of said structure being bowed, with its free end disposed between said catch and said hinge portion, for biasing said arms to open position.

6. The structure as defined in claim 5, wherein all the elements recited are comprised of a unitary body of polypropylene.

7. A floatable plastic gripper formed entirely of material having a specific gravity less than water, comprising a pair of arms generally U-shaped in cross-section hingedly connected at one end, the sides of said arms adjacent the connected end having closely fitting, resilient, overlapping portions, said portions of one arm fitting between said portions of the other arm to maintain said arms in alignment, each edge of said U-shaped arms beyond said overlapping portions having a series of notches to form teeth along said edge for gripping articles between said arms, one of said arms adjacent the connected end having an integrally formed resilient element engageable with the other arm to spread said arms apart, and integral, laterally projecting elements formed on said overlapping portions of one arm and complementary shoulders on the said portions of the other arm, said overlapping portions being yieldable to allow said elements and shoulders to move past each other, said elements and shoulders forming interengaging stops to limit opening movement of said arms by said resilient element.

References Cited by the Examiner

UNITED STATES PATENTS 2,525,678  10/1950  Hout _____ 294—50.8
3,140,715  7/1964  Whitton _____ 294—43 X GERALD M. FORLENZA, *Primary Examiner.*

G. ABRAHAM, *Assistant Examiner.*